(12) United States Patent
Okamoto et al.

(10) Patent No.: US 11,025,180 B2
(45) Date of Patent: *Jun. 1, 2021

(54) VARIABLE SPEED ACCELERATOR

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Nakashima, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/093,005

(22) PCT Filed: Jun. 15, 2016

(86) PCT No.: PCT/JP2016/067764
§ 371 (c)(1),
(2) Date: Oct. 11, 2018

(87) PCT Pub. No.: WO2017/216897
PCT Pub. Date: Dec. 21, 2017

(65) Prior Publication Data
US 2019/0181779 A1    Jun. 13, 2019

(51) Int. Cl.
*H02P 5/747* (2006.01)
*F16H 3/72* (2006.01)
(Continued)

(52) U.S. Cl.
CPC .............. *H02P 5/747* (2013.01); *F16H 3/72* (2013.01); *F16H 3/724* (2013.01); *F16H 3/727* (2013.01);
(Continued)

(58) Field of Classification Search
CPC .... H02P 5/747; H02P 5/46; H02P 6/04; F16H 3/724; F16H 3/727; H02K 7/116; H02K 7/003
See application file for complete search history.

(56) References Cited

U.S. PATENT DOCUMENTS 3,575,805 A    4/1971    Dempsey
5,062,824 A    11/1991   Prokopius
(Continued)

FOREIGN PATENT DOCUMENTS

DE    1963220 A1    7/1970
DE    2236588 A1    2/1974
(Continued)

OTHER PUBLICATIONS

International Search Report issued in corresponding International Application No. PCT/JP2016/067764 dated Aug. 23, 2016, with translation (4 pages).
(Continued)

*Primary Examiner* — Kawing Chan
*Assistant Examiner* — Bradley R Brown
(74) *Attorney, Agent, or Firm* — Osha Bergman Watanabe & Burton LLP

(57) ABSTRACT

A variable speed accelerator is provided, including an electric driving device generating a rotational driving force, and a planetary gear transmission device changing the speed of the rotational driving force and transmitting the changed rotation driving force to a driving target. The electric driving device includes: a variable-speed motor having a variable-speed rotor connected to a variable-speed input shaft of the transmission device; and a constant-speed motor having a constant-speed rotor connected to a constant-speed input shaft of the transmission device. The variable-speed rotor
(Continued)

and the planetary gear carrier shaft have a shaft insertion hole formed to pass therethrough in the axial direction.

4 Claims, 4 Drawing Sheets

(51) Int. Cl.
*H02K 7/116* (2006.01)
*H02K 7/00* (2006.01)
*H02P 5/46* (2006.01)
*H02P 6/04* (2016.01)

(52) U.S. Cl.
CPC ............ *H02K 7/003* (2013.01); *H02K 7/116* (2013.01); *H02P 5/46* (2013.01); *H02P 6/04* (2013.01)

(56) References Cited

U.S. PATENT DOCUMENTS

| | | | |
|---|---|---|---|
| 5,090,261 A | 2/1992 | Nakatsukasa | |
| 5,947,854 A | 9/1999 | Kopko | |
| 6,018,694 A | 1/2000 | Egami et al. | |
| 6,555,927 B1 | 4/2003 | Suzuki et al. | |
| 6,808,468 B1 | 10/2004 | Miyazaki et al. | |
| 7,207,919 B2 | 4/2007 | Tsuneyoshi et al. | |
| 7,322,891 B1 | 1/2008 | Prewitt | |
| 7,609,011 B2 | 10/2009 | Yatabe et al. | |
| 2003/0064847 A1* | 4/2003 | Oshidari | B60K 6/40 475/5 |
| 2005/0113201 A1 | 5/2005 | Kimura et al. | |
| 2006/0019756 A1 | 1/2006 | Lattin | |
| 2006/0101942 A1* | 5/2006 | Onishi | F16H 63/3026 74/665 R |
| 2006/0264296 A1 | 11/2006 | Moeller | |
| 2007/0093359 A1* | 4/2007 | Kobayashi | B60L 3/0069 477/107 |
| 2007/0155570 A1* | 7/2007 | Kimura | F16H 3/724 475/153 |
| 2007/0191169 A1 | 8/2007 | Fujita et al. | |
| 2009/0010094 A1 | 1/2009 | Uemura | |
| 2013/0249444 A1 | 9/2013 | Golding | |
| 2014/0194214 A1 | 7/2014 | Maeda | |
| 2016/0318506 A1* | 11/2016 | Kaifuku | B60L 15/2054 |
| 2017/0155345 A1 | 6/2017 | Kobayashi et al. | |
| 2018/0187778 A1 | 7/2018 | Okamoto et al. | |
| 2018/0245671 A1 | 8/2018 | Okamoto | |
| 2018/0252300 A1 | 9/2018 | Okamoto et al. | |
| 2019/0048978 A1 | 2/2019 | Okamoto | |
| 2019/0048979 A1 | 2/2019 | Okamoto | |
| 2019/0068090 A1 | 2/2019 | Okamoto | |
| 2019/0093742 A1 | 3/2019 | Okamoto | |
| 2019/0107189 A1 | 4/2019 | Kobayashi et al. | |
| 2019/0113111 A1 | 4/2019 | Okamoto et al. | |
| 2019/0170221 A1 | 6/2019 | Okamoto et al. | |
| 2019/0226557 A1 | 7/2019 | Okamoto et al. | |
| 2019/0264779 A1 | 8/2019 | Okamoto et al. | |

FOREIGN PATENT DOCUMENTS

| | | |
|---|---|---|
| EP | 1961602 A1 | 8/2008 |
| FR | 822746 A | 1/1938 |
| FR | 2094518 A5 | 2/1972 |
| FR | 2194064 A1 | 2/1974 |
| GB | 407760 A | 3/1934 |
| JP | S59-70497 A | 4/1984 |
| JP | H01-176247 U | 12/1989 |
| JP | H03-73745 U | 7/1991 |
| JP | H04-060254 A | 2/1992 |
| JP | H07-135701 A | 5/1995 |
| JP | H09-211015 A | 8/1997 |
| JP | H10-238381 A | 9/1998 |
| JP | 2000-324607 A | 11/2000 |
| JP | 2001-152901 A | 6/2001 |
| JP | 2003-34153 A | 2/2003 |
| JP | 2004-116542 A | 4/2004 |
| JP | 2004-150609 A | 5/2004 |
| JP | 2005-153727 A | 6/2005 |
| JP | 2006-38228 A | 2/2006 |
| JP | 2006-521517 A | 9/2006 |
| JP | 4183481 B2 | 11/2008 |
| JP | 4472350 B2 | 6/2010 |
| JP | 2010-242811 A | 10/2010 |
| JP | 2014-87170 A | 5/2014 |
| WO | 01-85483 A1 | 11/2001 |
| WO | 0185483 A1 | 11/2001 |
| WO | 03-071160 A1 | 8/2003 |
| WO | 03071160 A1 | 8/2003 |
| WO | 2013-035172 A1 | 3/2013 |
| WO | 2016-009668 A1 | 1/2016 |
| WO | 2016/010146 A1 | 1/2016 |
| WO | 2018-016021 A1 | 1/2018 |

OTHER PUBLICATIONS

Written Opinion of the International Searching Authority issued in corresponding International Application No. PCT/JP2016/067764 dated Aug. 23, 2016, with translation (10 pages).
International Search Report and Written Opinion in corresponding International Application No. PCT/JP2014/069253 dated Sep. 22, 2014 (20 pages).
International Search Report and Written Opinion in corresponding International Application No. PCT/JP2015/055064, dated May 19, 2015 (25 pages).
International Search Report and Written Opinion in corresponding International Application No. PCT/JP2015/070580, dated Sep. 29, 2015 (29 pages).
International Search Report and Written Opinion in corresponding International Application No. PCT/JP2016/067770, dated Sep. 6, 2016 (9 pages).
International Search Report and Written Opinion in corresponding International Application No. PCT/JP2016/084090, dated Feb. 14, 2017 (10 pages).
International Search Report and Written Opinion in corresponding International Application No. PCT/JP2016/071248, dated Oct. 11, 2016 (10 pages).
Non-Final Office Action in corresponding U.S. Appl. No. 15/320,905, dated Jan. 10, 2018 (26 pages).
Corrected Notice of Allowability in corresponding U.S. Appl. No. 15/320,905, dated Oct. 17, 2018 (4 pages).
Corrected Notice of Allowability in corresponding U.S. Appl. No. 15/320,905, dated Dec. 5, 2018 (4 pages).

* cited by examiner

AXIAL DIRECTION
INPUT SIDE ←——→ OUTPUT SIDE

VARIABLE SPEED ACCELERATOR

FIELD OF THE INVENTION

The present invention relates to a variable speed accelerator which includes an electric driving device including a constant-speed motor and a variable-speed motor, and a planetary gear transmission device for changing the speed of a rotational driving force generated by the electric driving device and then transmitting the speed-changed rotational driving force to a driving target.

BACKGROUND ART

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses that a constant-speed motor and a variable-speed motor for speed change are used as the electric driving device and a planetary gear transmission device is used as the transmission device to accurately control a gear ratio. In this apparatus, it is possible to change a rotation rate of an output shaft of the planetary gear transmission device connected to the rotary machine by changing a rotation rate of the variable-speed motor.

Further, as the variable speed accelerator, there is one having a structure in which a planetary gear carrier shaft constituting a planetary gear carrier of a planetary gear transmission device is a hollow shaft and an internal gear carrier shaft constituting an internal gear carrier is inserted through a hollow portion of the planetary gear carrier shaft.

In this variable speed accelerator, the constant-speed rotor of the constant-speed motor is connected to the internal gear carrier shaft, and the variable speed rotor of the variable-speed motor formed as a hollow shaft is connected to the planetary gear carrier shaft.

CITATION LIST

Patent Document

Patent Document 1

Japanese Patent Publication No. 4472350

SUMMARY OF INVENTION

Technical Problem

As a control method of a variable-speed motor constituting a variable speed accelerator, sensor-equipped vector control in which vector control is performed using a rotation rate sensor for measuring a rotation rate of a variable-speed motor is known.

Vector control with a sensor is a method of detecting the rotation rate of the variable-speed motor with the rotation rate sensor installed at the variable-speed motor and accurately calculating a magnitude of a load from a current flowing through the variable-speed motor by vector calculation. Accordingly, it is possible to determine the situation of the magnitude of the load or the rotation rate accurately and to generate a target rotation rate or torque.

As a structure for detecting the rotation rate of the variable-speed motor, for example, a structure in which a disk having a plurality of slits formed on the outer circumferential surface of the hollow shaft is provided and the rotation rate is detected using a light-emitting element and a light-receiving element is conceivable. However, in the case of this structure, there is a problem in that the structure becomes complicated, and so on.

The present invention relates to a variable speed accelerator which includes an electric driving device including a constant-speed motor having a constant-speed rotor and a variable-speed motor having a variable-speed rotor and a planetary gear transmission device for changing the speed of a rotational driving force generated by the electric driving device and then transmitting the speed-changed rotational driving force to a driving target and in which the constant-speed rotor is inserted through a hollow portion of the variable-speed rotor which is a hollow shaft, and it is an object of the present invention to provide a variable speed accelerator capable of more easily detecting a rotation rate of the variable-speed motor.

Solution to Problem

According to a first aspect of the present invention, a variable speed accelerator is provided, including an electric driving device which generates a rotational driving force, and a transmission device which changes the speed of the rotational driving force generated by the electric driving device and transmits the changed rotation driving force to a driving target, wherein the transmission device comprises a sun gear which rotates about an axis, a sun gear shaft which is fixed to the sun gear and extends in an axial direction around the axis, a planetary gear which meshes with the sun gear, revolves around the axis and rotates about its own center line, an internal gear which has a plurality of teeth aligned annularly around the axis and meshes with the planetary gear, a planetary gear carrier which has a planetary gear carrier shaft extending in the axial direction around the axis, a carrier main body fixing positions of a plurality of planetary gears and a transmitting gear transmitting rotation of the planetary gear carrier shaft to the carrier main body, and which supports the planetary gear to revolve around the axis and to be rotatable around a center line of the planetary gear itself, and an internal gear carrier which has an internal gear carrier shaft extending in the axial direction around the axis and supports the internal gear to be rotatable about the axis, the sun gear shaft forms an output shaft connected to the driving target, the internal gear carrier shaft forms a constant-speed input shaft, and the planetary gear carrier shaft forms a variable-speed input shaft, the electric driving device includes a variable-speed motor having a variable-speed rotor connected to a variable-speed input shaft of the transmission device, and a constant-speed motor having a constant-speed rotor connected to a constant-speed input shaft of the transmission device, the variable-speed rotor and the planetary gear carrier shaft are formed in a cylindrical shape centered on the axis and have a shaft insertion hole formed to pass therethrough in the axial direction, the constant-speed rotor is inserted through the shaft insertion hole, and the variable speed accelerator further includes a rotation rate sensor which measures a rotation rate of the transmitting gear, and a control device which performs vector control of the variable-speed motor based on the rotation rate measured by the rotation rate sensor.

According to such a constitution, due to the constitution in which the rotation rate of the transmitting gear rather than the rotation rate of the cylindrical variable-speed rotor and the planetary gear carrier shaft is measured using the rotation rate sensor, the rotation rate sensor can be installed more easily.

In the variable speed accelerator, the control device may calculate the rotation rate of the variable-speed rotor from the rotation rate of the transmitting gear based on a rotation rate ratio of the transmitting gear and the variable-speed rotor.

According to such a constitution, it is possible to calculate the rotation rate of the variable-speed rotor even when the rotation rate of the transmitting gear rather than the rotation rate of the variable-speed rotor is measured.

Advantageous Effects of Invention

According to the present invention, due to such a constitution in which a rotation rate of a transmitting gear is measured rather than a rotation rate of the variable-speed rotor and the planetary gear carrier shaft which have a cylindrical shape using a rotation rate sensor, the rotation speed sensor can be installed more easily.

DESCRIPTION OF EMBODIMENTS

Hereinafter, a variable speed accelerator according to an embodiment of the present invention will be described in detail with reference to the drawings.

Figure 1:
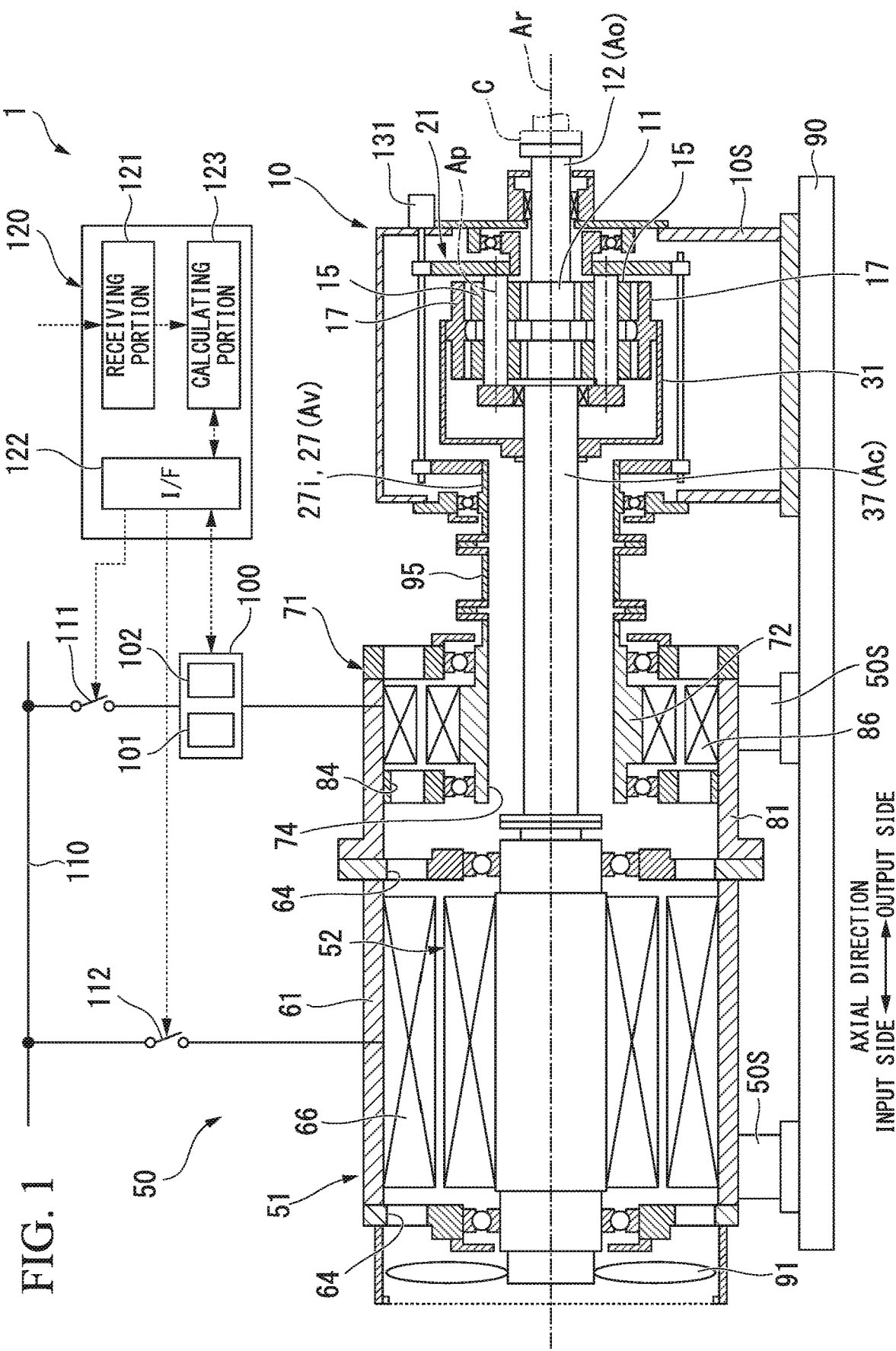
FIG. 1 is a cross-sectional view of a variable speed accelerator according to an embodiment of the present invention.

As shown in FIG. 1, the variable speed accelerator 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable speed accelerator 1 can be applied to, for example, a fluid mechanical system such as a compressor system.

The driving target of the variable speed accelerator 1 of the embodiment is a compressor C.

The transmission device 10 is a planetary gear transmission device.

The electric driving device 50 includes a constant-speed motor 51 having a constant-speed rotor 52 which rotates at a constant speed, and a variable-speed motor 71 having a variable-speed rotor 72 which rotates at an arbitrary rotation rate. Each of the constant-speed rotor 52 and the variable-speed rotor 72 is connected to the transmission device 10.

The electric driving device 50 is supported on a frame 90 by an electric driving device support portion 50S. The transmission device 10 is supported on the frame 90 by a transmission device support portion 10S. The electric driving device 50 and the transmission device 10, which are heavy objects, can be securely fixed by these support portions.

Figure 2:
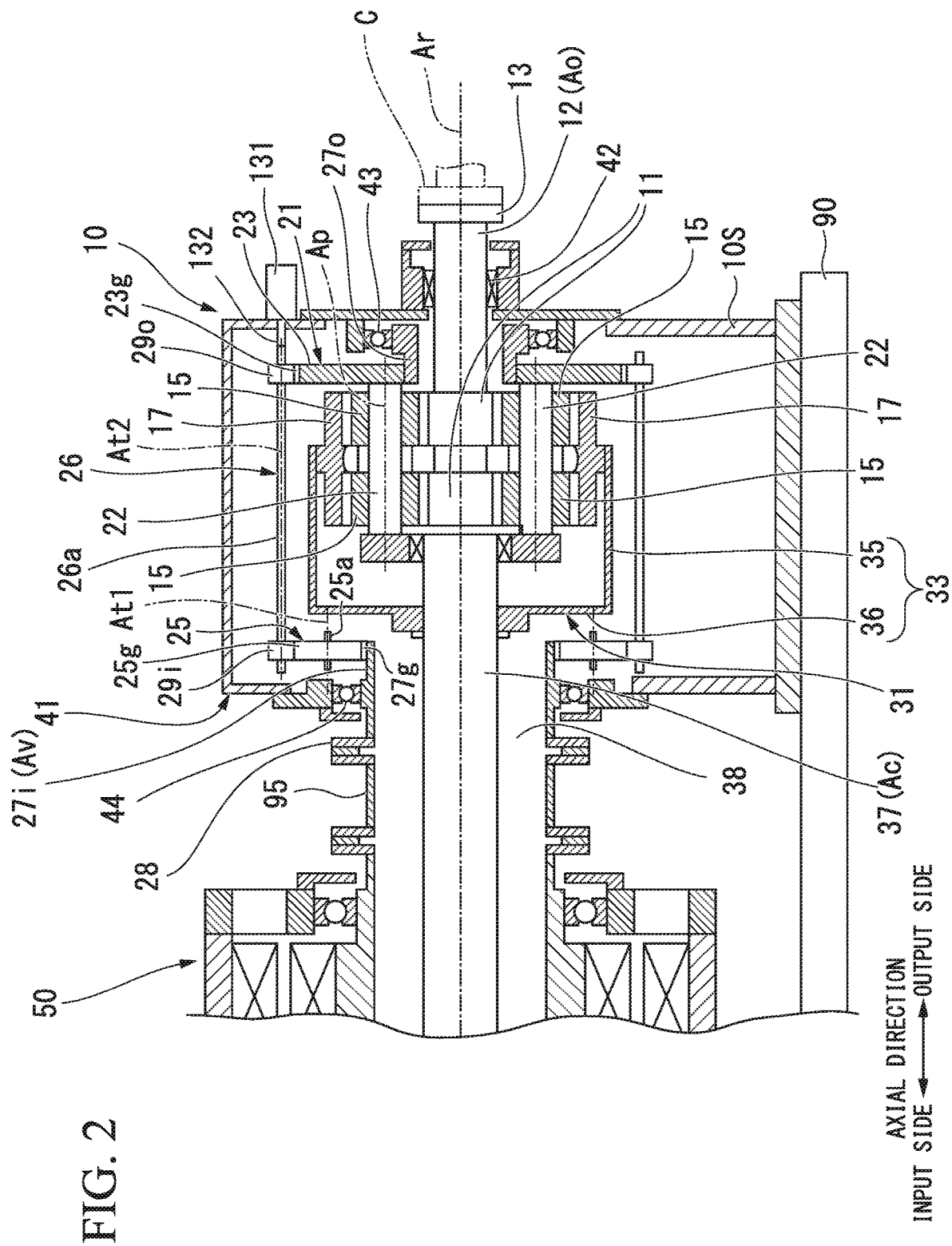
FIG. 2 is a cross-sectional view of a transmission device according to the embodiment of the present invention.

As shown in FIG. 2, the transmission device 10 includes a sun gear 11 which rotates about an axis Ar extending in a horizontal direction, a sun gear shaft 12 fixed to the sun gear 11, a plurality of planetary gears 15 which mesh with the sun gear 11, revolve around the axis Ar and rotate about their own center lines Ap, an internal gear 17 in which a plurality of teeth are arranged in an annular shape around the axis Ar and which meshes with the plurality of planetary gears 15, a planetary gear carrier 21 which supports the plurality of planetary gears 15 to allow the plurality of planetary gears 15 to revolve around the axis Ar and to rotate about their own center lines Ap, an internal gear carrier 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction. In the variable speed accelerator 1 of the embodiment, the electric driving device 50 is disposed on the input side in the axial direction, and the transmission device 10 is disposed on the output side of the electric driving device 50. The compressor C is disposed on the output side of the variable speed accelerator 1.

The sun gear shaft 12 has a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes a planetary gear shaft 22 provided for each of the plurality of planetary gears 15, a carrier main body 23 which fixes the relative positions of the plurality of planetary gear shafts 22, and an output-side planetary gear carrier shaft 27o which extends in the axial direction centered on the axis Ar. The output-side planetary gear carrier shaft 27o is fixed to an inner side of the carrier main body 23 in the radial direction.

The planetary gear shaft 22 passes through the center lines Ap of the planetary gears 15 in the axial direction and supports the planetary gears 15 to allow the planetary gears 15 to rotate about a center line thereof. The carrier main body 23 extends outward in the radial direction from the plurality of planetary gear shafts 22.

The output-side planetary gear carrier shaft 27o extends from the carrier main body 23 toward the output side. The output-side planetary gear carrier shaft 27o is formed in a cylindrical shape centered on the axis Ar.

The output-side planetary gear carrier shaft 27o is supported to be rotatable about the axis Ar by a planetary gear carrier bearing 43. The planetary gear carrier bearing 43 is installed at the transmission casing 41. The sun gear shaft 12 is inserted through the inner circumferential side of the output-side planetary gear carrier shaft 27o.

The planetary gear carrier 21 includes an input-side planetary gear carrier shaft 27i which is connected to the variable-speed rotor 72 of the variable-speed motor 71, and a first transmitting portion 25 and a second transmitting portion 26 which transmit rotation of the input-side planetary gear carrier shaft 27i to the carrier main body 23.

The input-side planetary gear carrier shaft 27*i* is a hollow shaft formed in a cylindrical shape centered on the axis Ar. The input-side planetary gear carrier shaft 27*i* is disposed on the input side of the transmission device 10 and is supported by the planetary gear carrier bearing 44 to be rotatable about the axis Ar. The planetary gear carrier bearing 44 is installed at the transmission casing 41. An internal gear carrier shaft 37 for driving the internal gear carrier 31 of the transmission device 10 is inserted through the inner circumferential side of the input-side planetary gear carrier shaft 27*i*.

An annular flange 28 which expands outward in the radial direction is formed at the input-side end of the input-side planetary gear carrier shaft 27*i*.

A carrier shaft gear 27*g* meshing with a first transmitting gear 25*g* of the first transmitting portion 25 is formed on the output-side end of the input-side planetary gear carrier shaft 27*i*.

The first transmitting portion 25 includes a first transmitting shaft 25*a* supported to be rotatable about an axis At1 and a first transmitting gear 25*g* fixed to the first transmitting shaft 25*a*. The first transmitting shaft 25*a* is installed at the transmission casing 41 via a bearing (not shown).

The second transmitting portion 26 includes a second transmitting shaft 26*a* supported to be rotatable about an axis At2, and an input-side transmitting gear 29*i* and an output-side transmitting gear 29*o* fixed to the second transmitting shaft 26*a*.

The second transmitting shaft 26*a* is installed at the transmission casing 41 via a bearing (not shown). The input-side transmitting gear 29*i* and the output-side transmitting gear 29*o* are fixed to both ends of the second transmitting shaft 26*a*.

The input-side transmitting gear 29*i* meshes with the first transmitting gear 25*g*. The output-side transmitting gear 29*o* meshes with a gear 23*g* formed on the outer circumference of the carrier main body 23. Accordingly, the rotation of the input-side planetary gear carrier shaft 27*i* is transmitted to the carrier main body 23 via the first transmitting portion 25 and the second transmitting portion 26.

The internal gear carrier 31 includes a carrier main body 33 to which the internal gear 17 is fixed, and the internal gear carrier shaft 37 which is fixed to the carrier main body 33 and extends in the axial direction centered on the axis Ar.

The carrier main body 33 includes a cylindrical portion 35 which has a cylindrical shape centered on the axis Ar and has the internal gear 17 fixed to the inner circumferential side thereof, and an input-side arm portion 36 which extends inward in the radial direction from the input-side end of the cylindrical portion 35.

The internal gear carrier shaft 37 having a column shape around the axis Ar is disposed on the input side of the sun gear shaft 12 having a column shape around the axis Ar. The input-side arm portion 36 of the carrier main body 33 is fixed to the internal gear carrier shaft 37. The internal gear carrier shaft 37 is inserted through the inner circumferential side of the cylindrical input-side planetary gear carrier shaft 27*i*.

Figure 3:
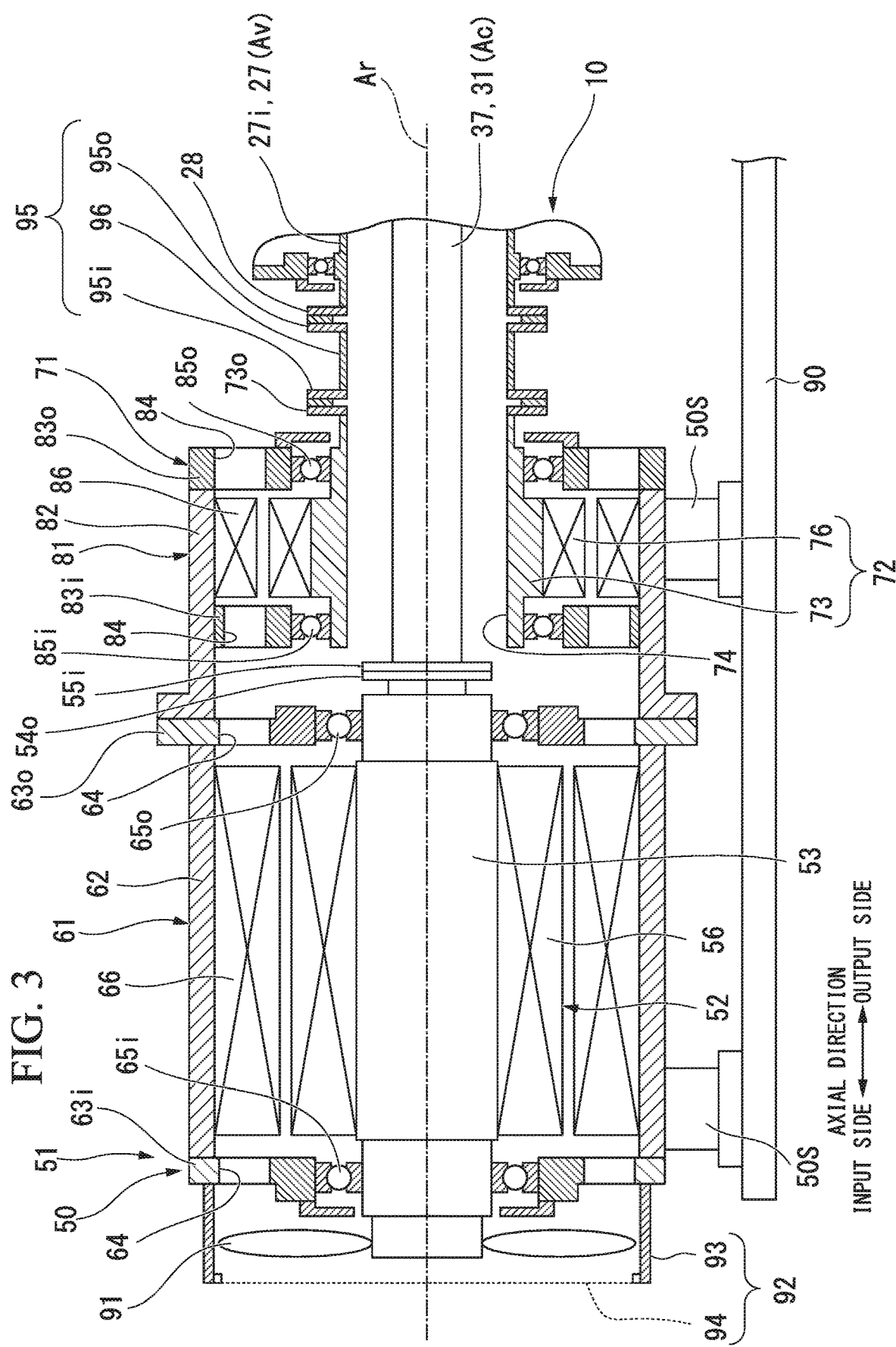
FIG. 3 is a cross-sectional view of an electric driving device according to an embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27*i* of the transmission device 10. The electric driving device 50 has a cooling fan 91 which cools the constant-speed motor 51 and a fan cover 92 which covers the cooling fan 91.

The internal gear carrier shaft 37 is a constant-speed input shaft Ac which rotates at a constant speed under a driving force of the constant-speed motor 51. The input-side planetary gear carrier shaft 27*i* is a variable speed input shaft Av which rotates at an arbitrary rotation rate under a driving force of the variable-speed motor 71.

The variable speed accelerator 1 can change the rotation rate of an output shaft Ao of the transmission device 10 connected to the driving target by changing the rotation rate of the variable-speed motor 71.

In the embodiment, the constant-speed motor 51 is, for example, a four-pole three-phase induction motor. Further, the variable-speed motor 71 is a six-pole three-phase induction motor having more poles than the constant-speed motor 51. The specifications of the constant-speed motor 51 and the variable-speed motor 71 are not limited to these and can be appropriately changed.

The constant-speed motor 51 includes a constant-speed rotor 52 which rotates about the axis Ar and is connected to the internal gear carrier shaft 37 which is the constant-speed input shaft Ac of the transmission device 10, a constant-speed stator 66 disposed on the outer circumferential side of the constant-speed rotor 52, and a constant-speed motor casing 61 in which the constant-speed stator 66 is fixed to the inner circumferential side thereof.

The constant-speed rotor 52 includes a constant-speed rotor shaft 53 which has a column shape around the axis Ar, and a conductive body 56 fixed to the outer circumference of the constant-speed rotor shaft 53. The cooling fan 91 is fixed to the input side end of the constant-speed rotor shaft 53.

The constant-speed stator 66 is disposed radially outward from the conductive body 56 of the constant-speed rotor 52. This constant-speed stator 66 is formed of a plurality of coils.

The constant-speed motor casing 61 includes a casing main body 62 having a cylindrical shape centered on the axis Ar and in which the constant-speed stator 66 is fixed to the inner circumferential side thereof, and covers 63*i* and 63*o* which close both axial ends of the cylindrical casing main body 62. Constant-speed rotor bearings 65*i* and 65*o* are installed at the respective covers 63*i* and 63*o* to rotatably support the constant-speed rotor shaft 53 about the axis Ar. A plurality of openings 64 axially passing through the respective covers 63*i* and 63*o* at positions radially outward from the constant-speed rotor bearing 65*i* are formed in the respective covers 63*i* and 63*o*.

The input-side end of the constant-speed rotor shaft 53 protrudes toward the input side from the input-side cover 63*i* of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes a cylindrical cover main body 93 disposed on the outer circumferential side of the cooling fan 91, and an air-circulating plate 94 installed at an opening of the cover main body 93 on the inlet side and having a plurality of air holes formed therein. The fan cover 92 is fixed to the cover 63*i* of the constant-speed motor casing 61 on the input side.

The variable-speed motor 71 includes a variable-speed rotor 72 which rotates about the axis Ar and is connected to the input-side planetary gear carrier shaft 27*i* which is the variable-speed input shaft Av, a variable-speed stator 86 disposed on the outer circumferential side of the variable-speed rotor 72, and a variable-speed motor casing 81 in which the variable-speed stator 86 is fixed to the inner circumferential side thereof.

The variable-speed rotor 72 has a variable-speed rotor shaft 73 and a conductive body 76 fixed to the outer circumference of the variable-speed rotor shaft 73. The variable-speed rotor shaft 73 is a hollow shaft which has a cylindrical shape around the axis Ar and has a shaft insertion hole 74 passing through the variable-speed rotor shaft 73 in the axial direction. The internal gear carrier shaft 37 is inserted through the shaft insertion hole 74 of the variable-speed rotor shaft 73 as the constant-speed input shaft Ac. An annular flange 73o expanding radially outward is formed at the output-side end of the variable-speed rotor shaft 73.

The variable-speed stator 86 is disposed radially outward from the conductive body 76 of the variable-speed rotor 72. The variable-speed stator 86 is formed of a plurality of coils.

The variable-speed motor casing 81 includes a casing main body 82 having a cylindrical shape around the axis Ar and to the inner circumferential side of which the variable-speed stator 86 is fixed, an output-side cover 83o which closes the output-side end of the cylindrical casing main body 82, and an inlet-side cover 83i disposed on the input side of the variable-speed stator 86 and fixed to the inner circumferential side of the cylindrical casing main body 82. Variable-speed rotor bearings 85i and 85o which rotatably support the variable-speed rotor shaft 73 about the axis Ar are installed at the respective covers 83i and 83o. In the respective covers 83i and 83o, a plurality of openings 84 passing through the respective covers 83i and 83o in the axial direction are formed at positions radially outward from the variable-speed rotor bearings 85i and 85o.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

Further, in the variable speed accelerator 1 of the embodiment, the constant-speed rotor 52, the variable-speed rotor 72 and the sun gear shaft 12 are arranged on the same axis.

Figure 4:
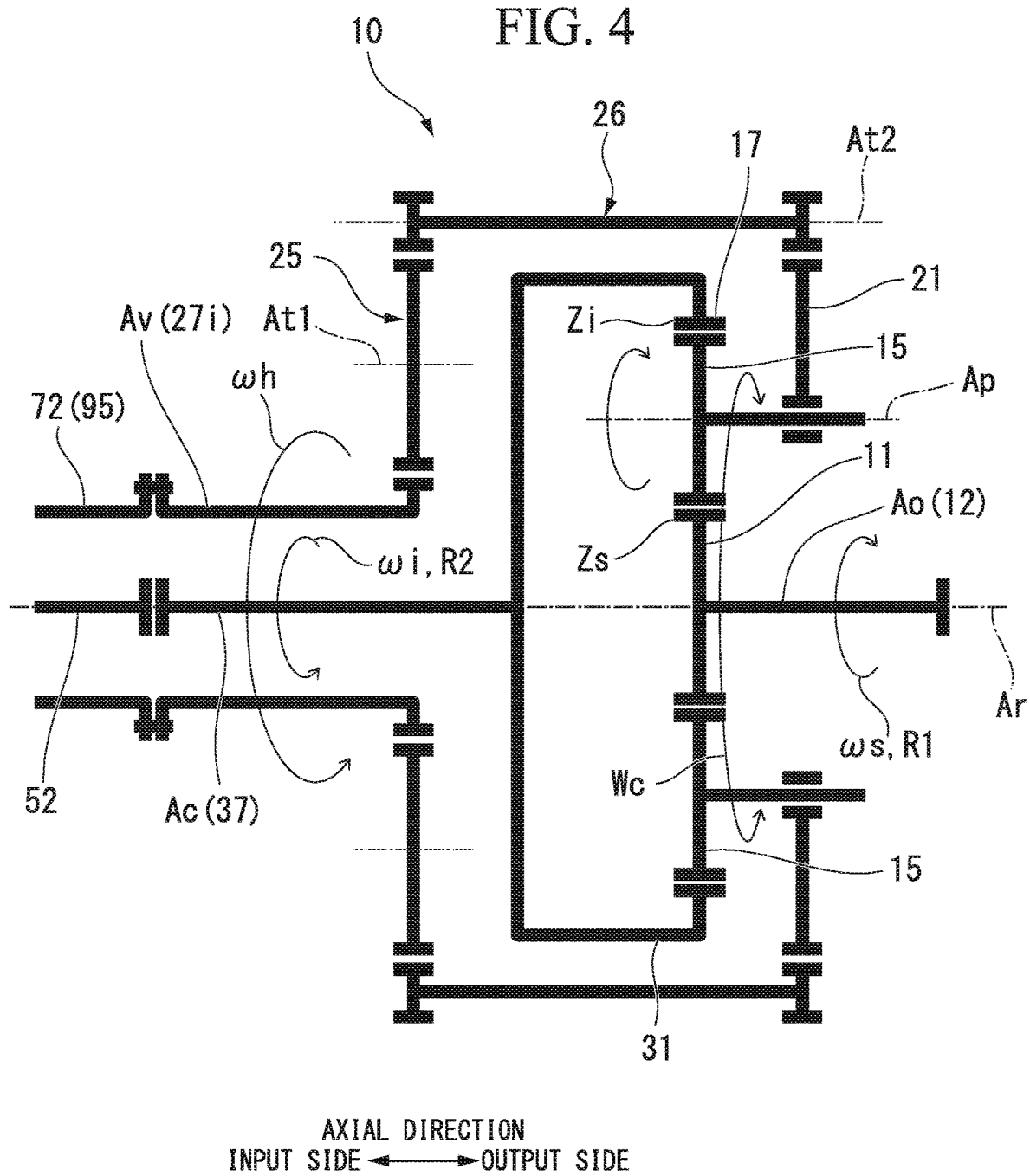
FIG. 4 is a schematic diagram showing a constitution of the transmission device according to the embodiment of the present invention.

As shown in FIG. 4, the constant-speed motor 51 is set to rotate the constant-speed rotor 52 (internal gear 17) in the second direction R2 in the circumferential direction of the axis Ar by supplying the electric power to the constant-speed motor 51. As the constant-speed rotor 52 rotates in the second direction R2, the internal gear carrier shaft 37 and the internal gear carrier 31 rotate in the second direction R2.

The output shaft Ao of the transmission device 10 is set to rotate in the first direction R1 opposite to the second direction R2 by the constant-speed rotor 52 of the constant-speed motor 51 rotating at the maximum rotation rate in the second direction R2. That is, the forward rotation of the constant-speed motor 51 is the second direction R2, and the forward rotation of the output shaft Ao of the transmission device 10 is the first direction R1. The compressor C operates normally as the output shaft Ao rotates forward.

In the following description, the rotation direction of the first direction R1 is referred to as a positive rotation direction, and the rotation direction of the second direction R2 is referred to as a negative rotation direction. For example, the maximum rotation rate of the constant-speed motor 51 is −1800 rpm.

The variable-speed motor 71 rotationally drives the variable-speed rotor 72 (planetary gear carrier 21) in the first direction R1 and the second direction R2, which are the circumferential directions of the axis Ar. That is, the variable-speed motor 71 can rotate forward and in reverse.

The variable-speed motor 71 serves as a generator by rotating the variable-speed rotor 72 in the second direction R2. A state in which the variable-speed motor 71 serves as a generator is referred to as a generator mode. That is, the variable-speed rotor 72 of the variable-speed motor 71 rotates in the second direction R2 in the generator mode.

The variable-speed motor 71 serves as an electric motor by rotating the variable-speed rotor 72 in the first direction R1. A state in which the variable-speed motor 71 serves as an electric motor is referred to as an electric motor mode. That is, the variable-speed rotor 72 of the variable-speed motor 71 rotates in the first direction R1 in the electric motor mode.

When the variable-speed rotor 72 rotates in the first direction R1, the planetary gear carrier 21 rotates in the first direction R1.

The variable speed accelerator 1 of the embodiment includes a rotation rate sensor 131 which measures the rotation rate of the second transmitting shaft 26a. The rotation rate measured by the rotation rate sensor 131 is transmitted to the controller 120. The controller 120 calculates the rotation rate of the variable-speed motor 71 (variable-speed rotor 72) using the rotation rate measured by the rotation rate sensor.

The rotation rate sensor 131 includes a detection shaft 132 which is connectable to the second transmitting shaft 26a.

The detection shaft 132 of the rotation rate sensor 131 is connected to the end of the second transmitting shaft 26a so that the second transmitting shaft 26a and the detection shaft 132 are on the same straight line. The rotation rate sensor 131 is fixed to the transmission casing 41.

The controller 120 calculates a rotation rate $\omega h$ of the variable-speed rotor 72 using a rotation rate ratio $\omega h/\omega t$ of a rotation rate $\omega h$ of the variable-speed rotor 72 to a rotation rate $\omega t$ of the second transmitting shaft 26a. The rotation rate ratio $\omega h/\omega t$ is determined from the number of teeth of the first transmitting gear 25g and the input-side transmitting gear 29i.

The variable speed accelerator 1 of the embodiment includes a rotation rate controller 100 which controls the rotation rate of the variable-speed motor 71, a variable-speed motor switch 111 which sets the variable-speed motor 71 to be in a power supply state and a power cutoff state, a constant-speed motor switch 112 which sets the constant-speed motor 51 to be in the power supply state and the power cutoff state, and the controller 120 which controls operations of the rotation rate controller 100, the variable-speed motor switch 111 and the constant-speed motor switch 112.

The controller 120 is constituted of a computer. The controller 120 includes a receiving portion 121 which directly receives an instruction from an operator or receives an instruction from a host control device, an interface 122 which provides instructions to the variable-speed motor switch 111, the rotation rate controller 100 and the constant-speed motor switch 112, and a calculating portion 123 which creates an instruction for the variable-speed motor switch 111, the constant-speed motor switch 112, and the rotation rate controller 100 according to the instructions received by the receiving portion 121 or the like.

The variable-speed motor switch 111 is electrically connected to a power source line 110 and the rotation rate controller 100. The rotation rate controller 100 is electrically connected to the variable-speed motor 71. The constant-speed motor switch 112 is electrically connected to the power source line 110 and the constant-speed motor 51.

The variable-speed motor switch 111 is turned on by an ON instruction from the controller 120 and turned off by an OFF instruction from the controller 120. When the variable-speed motor switch 111 is turned on, electric power from the power source line 110 is supplied to the variable-speed motor 71 through the rotation rate controller 100, and the variable-speed motor 71 is in the power supply state. When the variable-speed motor switch 111 is turned off, the power supply from the power source line 110 to the rotation rate controller 100 and the variable-speed motor 71 is cut off, and the variable-speed motor 71 is in the power cutoff state.

The constant-speed motor switch 112 is turned on by an ON instruction from the controller 120 and turned off by an OFF instruction from the controller 120. When the constant-speed motor switch 112 is turned on, the electric power from the power source line 110 is supplied to the constant-speed motor 51, and the constant-speed motor 51 is in the power supply state. When the constant-speed motor switch 112 is turned off, the power supply from the power source line 110 to the constant-speed motor 51 is cut off, and the constant-speed motor 51 is in the power cutoff state.

The calculating portion 120 calculates a frequency which will be supplied to the variable-speed motor 71 using sensor-equipped vector control. Specifically, feedback control is performed using the rotation rate $\omega h$ of the variable-speed motor 71 calculated using the rotation rate $\omega t$ of the second transmitting shaft 26a detected by the rotation rate sensor 131. Here, the vector control is a method of decomposing a current flowing through the electric motor into a current component for generating a torque and a current component for generating a magnetic flux and independently controlling the respective current components.

The rotation rate controller 100 includes a frequency conversion portion 101 which changes a frequency of the electric power supplied from the power source line 110, and a rotation direction-switching portion 102 which changes a rotation direction of the variable-speed motor 71.

The frequency conversion portion 101 supplies the electric power having a frequency instructed by the controller 120 to the variable-speed motor 71. The variable-speed rotor 72 of the variable-speed motor 71 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the sun gear shaft 12, which is the output shaft Ao of the transmission device 10, also changes.

The rotation direction-switching portion 102 is a device which changes the rotation direction of the variable-speed motor 71 by using a circuit for switching a plurality of (three in the case of the embodiment) power source lines connected to the variable-speed motor 71. That is, the rotation direction-switching portion 102 can rotate the variable-speed rotor 72 forward and in reverse.

Here, the relationship between the number of teeth of each gear of the transmission device 10 and the rotation rate of each shaft of the transmission device 10 will be described with reference to FIG. 4.

The rotation rate of the sun gear shaft 12 as the output shaft Ao is indicated by $\omega s$, the rotation rate of the internal gear carrier shaft 37 (constant-speed motor 51) that is the constant-speed input shaft Ac is indicated by $\omega i$, and the rotation rate of the input-side planetary gear carrier shaft 27i (variable-speed motor 71) that is the variable-speed input shaft Av is indicated by $\omega h$. Further, the number of teeth of the sun gear 11 is indicated by Zs, and the number of teeth of the internal gear 17 is indicated by Zi.

Also, a ratio $\omega s/\omega i$ of the rotation rate ° is of the output shaft Ao to the rotation rate on of the constant-speed motor 51 is indicated by U. The ratio U of the rotation rate $\omega s$ of the output shaft Ao to the rotation rate on of the constant-speed motor 51 is the same as a ratio Zi/Zs of the number of teeth Zi of the internal gear 17 to the number of teeth Zs of the sun gear 11.

Also, a ratio $\omega c/\omega h$ of the rotation rate we of the planetary gear carrier 21 to the rotation rate $\omega h$ of the variable-speed motor 71 is indicated by P.

The relationship between the number of teeth of each gear and the rotation rate of each shaft in the transmission device 10 can be expressed by the following Formula (1):

$$\omega s/\omega i = P \times \omega h/\omega i - (1 - P \times \omega h/\omega i) \times U \qquad (1)$$

When the constant-speed motor 51 is a four-pole induction motor and the power source frequency is 60 Hz, the rotation rate $\omega i$ (rated rotation rate) of the constant-speed rotor 52 (constant-speed input shaft Ac) is 1,800 rpm. Further, when the variable-speed motor 71 is an eight-pole induction motor and the power source frequency is 60 Hz, the maximum rotation rate $\omega h$ (rated rotation rate) of the variable-speed rotor 72 (variable-speed input shaft Av) is 900 rpm.

Further, the ratio U of the rotation rate ° is of the output shaft Ao to the rotation rate $\omega i$ of the constant-speed motor 51 (ratio Zi/Zs of the number of teeth Zs of the sun gear 11 to the number of teeth Zi of the internal gear 17) is set to 4.

Furthermore, the ratio P of the rotation rate we of the planetary gear carrier 21 to the rotation rate $\omega h$ of the variable-speed motor 71 is set to 0.3.

In this case, when the rotation direction of the constant-speed rotor 52 (internal gear 17) is the rotation (−1,800 rpm) in the second direction R2 and the rotation direction of the variable-speed rotor 72 (planetary gear carrier 21) has the maximum rotation rate (900 rpm) in a direction opposite to the rotation of the constant-speed rotor 52 (rotation in the first direction R1), the rotation rate $\omega s$ of the sun gear shaft 12, which is the output shaft Ao, is 8,550 rpm. This rotation rate (8,550 rpm) is the maximum rotation rate of the sun gear shaft 12.

That is, in the transmission device 10 of the embodiment, the rotation rate $\omega s$ of the output shaft Ao becomes the maximum rotation rate when the internal gear 17 corresponding to the constant-speed input shaft Ac rotates at −1,800 rpm and the planetary gear carrier 21 corresponding to the variable-speed input shaft Av rotates at 900 rpm.

Assuming that a variable speed range of the variable-speed input shaft Av is from −900 rpm to +900 rpm, the rotation rate $\omega s$ of the output shaft Ao lowers as the rotation rate of the variable-speed input shaft Av approaches −900 rpm.

According to the above-described embodiment, since the rotation rate $\omega h$ of the variable-speed motor 71 can be calculated using the rotation rate sensor 131, it becomes possible to control the variable-speed motor 71 using the sensor-equipped vector control. Therefore, it is possible to determine a situation of a magnitude of a load and a rotation rate accurately and to generate a target rotation rate or torque.

Further, the rotation rate sensor 131 is connected to the second transmitting shaft 26a rather than the variable-speed rotor 72 which is a hollow shaft or the input-side planetary gear carrier shaft 27i. In other words, the rotation rate sensor 131 is configured to measure the rotation rate of the second transmitting shaft 26a rather than the rotation rate of the cylindrical variable-speed rotor 72 and the planetary gear carrier shaft 27i. Accordingly, the rotation rate sensor 131 can be installed more easily. Specifically, it is possible to detect the rotation rate of the variable-speed motor 71 at low cost using a general-purpose rotation rate sensor.

Further, the controller 120 of the embodiment calculates the rotation rate ωh of the variable-speed rotor 72 from the rotation rate ωt of the second transmitting shaft 26a on the basis of the rotation rate ratio between the second transmitting shaft 26a and the variable-speed rotor 72. Therefore, the rotation rate ωh of the variable-speed rotor 72 can be calculated even when the rotation rate ωt of the second transmitting shaft 26a rather than the rotation rate ωh of the variable-speed rotor 72 is measured.

Further, in the embodiment, the internal gear carrier shaft 37, which is a rod-shaped shaft, is inserted through the variable-speed rotor shaft 73, which is a cylindrical shaft formed with the shaft insertion hole 74. That is, the constant-speed input shaft Ac having a large output is inserted through the variable-speed rotor shaft 73 of the variable-speed motor 71 having a smaller output than the constant-speed motor 51. Accordingly, as the constant-speed motor 51, one having a larger output (horsepower) can be adopted.

Further, in the embodiment, the whole apparatus can be made more compact by arranging the constant-speed motor 51, the variable-speed motor 71, the transmission device and the compressor C linearly in this order.

In the embodiment, the rotation rate sensor 131 is connected to the output-side end of the second transmitting shaft 26a, but the present invention is not limited thereto. The rotation rate sensor 131 may be connected to the input-side end of the second transmitting shaft 26a.

Further, the rotation rate sensor 131 may be connected to the first transmitting shaft 25a. That is, the rotation rate sensor 131 can be connected to a rotary shaft which rotates such that there is a predetermined ratio of rotation rate thereof to that of the variable-speed rotor 72.

Further, in the above-described embodiment, a four-pole three-phase induction motor is exemplified as a constant-speed motor 51 suitable for rotating the compressor C at high speed, and a six-pole three-phase induction motor is exemplified as a variable-speed motor 71 suitable for varying the rotation rate of the compressor C within a certain range. However, when it is unnecessary to rotate the driving target at high speed, other types of electric motors may be used as the constant-speed motor 51 and the variable-speed motor 71.

REFERENCE SIGNS LIST

1 Variable speed accelerator
10 Transmission device
11 Sun gear
12 Sun gear shaft
15 Planetary gear
17 Internal gear
21 Planetary gear carrier
22 Planetary gear shaft
25 First transmitting portion
25g First transmitting gear
26 Second transmitting portion
26g Second transmitting gear
27 Planetary gear carrier shaft
27i Input-side planetary gear carrier shaft
27o Output-side planetary gear carrier shaft
31 Internal gear carrier
37 Internal gear carrier shaft
41 Transmission casing
42 Sun gear bearing
50 Electric driving device
51 Constant-speed motor
52 Constant-speed rotor
53 Constant-speed rotor shaft
56 Conductive body
61 Constant-speed motor casing
66 Constant-speed stator
71 Variable-speed motor
72 Variable-speed rotor
73 Variable-speed rotor shaft
74 Shaft insertion hole
76 Conductive body
81 Variable-speed motor casing
86 Variable-speed stator
100 Rotation rate controller
101 Frequency conversion portion
102 Rotation direction-switching portion
110 Power source line
111 Variable-speed motor switch
112 Constant-speed motor switch
120 Controller (control device)
121 Receiving portion
122 Interface
123 Calculating portion
131 Rotation rate sensor
Ac Constant-speed input shaft
Ao Output shaft
Ar Axis
Av Variable-speed input shaft
C Compressor
R1 First direction
R2 Second direction

The invention claimed is:

1. A variable speed accelerator, comprising:
an electric driving device which generates a rotational driving force; and
a transmission device which changes the speed of the rotational driving force generated by the electric driving device and transmits the changed rotational driving force to a driving target, wherein
the transmission device comprises:
a sun gear which rotates about a main axis,
a sun gear shaft which is fixed to the sun gear, which is centered on the main axis, and extends in a direction of the main axis,
a planetary gear which meshes with the sun gear, revolves around the main axis and rotates about a center line of the planetary gear,
an internal gear which has a plurality of teeth aligned annularly around the main axis, and meshes with the planetary gear,
a planetary gear carrier which has a planetary gear carrier shaft centered on the main axis and extending in the direction of the main axis, a carrier main body fixing positions of a plurality of planetary gears, and a transmitting gear transmitting rotation of the planetary gear carrier shaft to the carrier main body, and the planetary gear carrier supporting the planetary gear to revolve around the main axis and to be rotatable around a center line of the planetary gear, and
an internal gear carrier which has an internal gear carrier shaft centered on the main axis, extending in the direction of the main axis and supports the internal gear to be rotatable about the main axis,
the sun gear shaft forms an output shaft connected to the driving target, the internal gear carrier shaft forms a constant-speed input shaft, and the planetary gear carrier shaft forms a variable-speed input shaft, the electric driving device includes a variable-speed motor having a variable-speed rotor connected to a variable-speed input shaft of the transmission device, and a constant-speed motor having a constant-speed rotor connected to a constant-speed input shaft of the transmission device, the variable-speed rotor and the planetary gear carrier shaft are formed in a cylindrical shape centered on the main axis and have a shaft insertion hole formed to pass therethrough in the direction of the main axis, the constant-speed rotor is inserted through the shaft insertion hole, a first transmitting portion of the planetary gear carrier includes:
- a first transmitting shaft supported rotatably about a first sub axis, and
- a first transmitting gear fixed to the first transmitting shaft, a second transmitting portion of the planetary gear carrier includes:
- a second transmitting shaft supported rotatably about a second sub-axis, and
- an input-side transmitting gear and an output-side transmitting gear that are fixed to the second transmitting shaft, a carrier shaft gear that meshes with the first transmitting gear is formed on an output-side end of the planetary gear carrier shaft, the input-side transmitting gear meshes with the first transmitting gear and the output-side transmitting gear meshes with the carrier shaft gear, rotation of the planetary gear carrier shaft is transmitted to the carrier main body via the first transmitting portion and the second transmitting portion, the variable speed accelerator further includes:

- a rotation rate sensor which includes a detection shaft for measuring a rotation rate of the transmitting gear, and
- a control device which performs vector control of the variable-speed motor based on the rotation rate measured by the rotation rate sensor, and the detection shaft of the rotation rate sensor is connected to the second transmitting shaft, and the second sub-axis of the second transmitting shaft is coaxially aligned with an axial line of the detection shaft.

2. The variable speed accelerator according to claim 1, wherein the control device calculates the rotation rate of the variable-speed rotor from the rotation rate of the second transmitting shaft based on a rotation rate ratio of the second transmitting shaft and the variable-speed rotor.

3. The variable speed accelerator according to claim 1, wherein
the transmission device comprises a transmission casing covering the sun gear, the sun gear shaft, the planetary gear, the internal gear, the planetary gear carrier shaft, the carrier main body, the planetary gear carrier, and the internal gear carrier, and
the rotation rate sensor is fixed to the transmission casing, and
the first and second transmitting shafts are rotatably supported by the transmission casing.

4. The variable speed accelerator according to claim 1, wherein
the vector control decomposes a current flowing through the variable-speed motor into a current component for generating torque and a current component for generating magnetic flux and independently controlling the respective current components.

* * * * *